(12) United States Patent
Maerkle et al.

(10) Patent No.: US 6,684,367 B1
(45) Date of Patent: Jan. 27, 2004

(54) CHANNEL CODING BASED ON HIDDEN PUNCTURING FOR PARTIAL-BAND INTERFERENCE CHANNELS

(75) Inventors: Rainer Thomas Maerkle, München (DE); Carl-Erik Wilhelm Sundberg, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 429 days.

(21) Appl. No.: 09/687,632

(22) Filed: Oct. 13, 2000

(51) Int. Cl.[7] .............................................. H03M 13/03
(52) U.S. Cl. ...................................................... 714/790
(58) Field of Search ................................ 714/755, 774, 714/784, 790, 786

(56) References Cited

U.S. PATENT DOCUMENTS

| | | | |
|---|---|---|---|
| 5,463,641 A | | 10/1995 | Dorward et al. |
| 5,812,601 A | * | 9/1998 | Schramm ..................... 375/262 |
| 5,949,796 A | | 9/1999 | Kumar |
| 5,970,085 A | * | 10/1999 | Yi ............................... 370/342 |
| 6,005,894 A | | 12/1999 | Kumar |
| 6,108,386 A | | 8/2000 | Chen et al. |
| 6,233,713 B1 | * | 5/2001 | Van Den Berghe et al. 714/790 |
| 6,272,183 B1 | * | 8/2001 | Berens et al. ................ 375/262 |
| 6,314,289 B1 | * | 11/2001 | Eberlein et al. ............. 455/427 |
| 6,347,122 B1 | * | 2/2002 | Chen et al. ................... 375/262 |
| 6,353,637 B1 | * | 3/2002 | Mansour et al. ............. 375/260 |
| 6,359,877 B1 | * | 3/2002 | Rathonyi et al. ............ 370/349 |
| 6,370,669 B1 | * | 4/2002 | Eroz et al. ................... 714/774 |
| 6,430,722 B1 | * | 8/2002 | Eroz et al. ................... 714/755 |
| 6,430,724 B1 | * | 8/2002 | Laneman et al. ............ 714/780 |
| 6,523,147 B1 | * | 2/2003 | Kroeger et al. .............. 714/792 |

OTHER PUBLICATIONS

B.W. Kroeger and A.J. Vigil, "Improved IBOC DAB Technology for AM and FM Broadcasting," SBE Engineering Conference, pp. 1–10, 1996.

B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.
B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.
G.D. Forney, Jr., "Generalized Minimum Distance Decoding," IEEE Transactions on Information Theory, vol. IT–12, No. 2, pp. 125–131, Apr. 1996.
G. Einarsson et al., "A Note on Soft Decision Decoding with Successive Erasures," IEEE Transactions on Information Theory, pp. 88–96, Jan. 1976.
D. Sinha, J.D. Johnston, S. Dorward and S.R. Quackenbush, "The Perceptual Audio Coder," in Digital Audio, Section 42, pp. 42–1 to 42–18, CRC Press, 1998.

(List continued on next page.)

Primary Examiner—Albert Decady
Assistant Examiner—Esaw Abraham
(74) Attorney, Agent, or Firm—Ryan, Mason & Lewis, LLP

(57) ABSTRACT

Digital information is processed for transmission in a communication system using a hidden puncturing technique. The digital information is encoded using a channel code having at least one puncturing pattern associated therewith. The puncturing pattern is preferably a rate compatible puncturing pattern. In accordance with the invention, there is no puncturing of the channel code applied at a transmitter side of the system. Instead, the resulting channel coded bits are assigned to different sections of a digital sideband or other portion of a frequency spectrum of the system, based at least in part on the puncturing pattern. The coded channel bits are then transmitted through the system in the assigned sections, and can be decoded at different code rates in a receiver of the system depending on which of the sections are used in the decoding process. By allowing different sections to be erased and the decoding to proceed at a corresponding higher code rate, the invention alleviates the effects of partial-band interference in the system.

19 Claims, 5 Drawing Sheets

OTHER PUBLICATIONS

J. Hagenauer, "Rate Compatible Punctured Convolutional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

R.V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

Y. Yasuda et al., "High–Rate Punctured Convolutional Codes for Soft Decision Viterbi Decoding," IEEE Transactions on Communications, vol. 32, Mar. 1984.

S. Kallel, "Complementary Punctured Convolutional Codes and Their Applications," IEEE Transactions on Communications, vol. 43, No. 6, pp. 2005–2009, Jun. 1995.

* cited by examiner

FIG. 4

| RATE (R) | FREE HAMMING DISTANCE ($d_f$) | PUNCTURING |
|---|---|---|
| 1/2 | 10 | 1 1 1 1 <br> 1 1 1 1 |
| 4/7 | 7 | 1 1 1 1 <br> 1 1 1 0 |
| 2/3 | 6 | 1 1 1 1 <br> 1 0 1 0 |
| 4/5 | 4 | 1 1 1 1 <br> 1 0 0 0 |

FIG. 5

| COMPONENT CODE RATE | TOTAL RATE | PUNCTURING |
|---|---|---|
| 8/16 | 1/3 | 1 1 1 1 1 1 1 1 <br> 1 1 1 1 1 1 1 1 |
| 8/14 | 2/5 | 1 1 1 1 1 1 1 1 <br> 1 1 1 0 1 1 1 0 |
| 8/13 | 4/9 | 1 1 1 1 1 1 1 1 <br> 1 1 1 0 1 0 1 0 |
| 8/12 | 1/2 | 1 1 1 1 1 1 1 1 <br> 1 0 1 0 1 0 1 0 |
| 8/11 | 4/7 | 1 1 1 1 1 1 1 1 <br> 1 0 1 0 1 0 0 0 |
| 8/10 | 2/3 | 1 1 1 1 1 1 1 1 <br> 1 0 0 0 1 0 0 0 |
| 8/9 | 4/5 | 1 1 1 1 1 1 1 1 <br> 1 0 0 0 0 0 0 0 |

| TOTAL RATE | COPONENT CODE RATE ($R_c$) | PUNCTURING |
|---|---|---|
| 1/2 | 2/3 | 1 1 1 1<br>1 1 1 1 |
| 4/7 | 8/11 | 1 1 1 1<br>1 1 1 0 |
| 2/3 | 8/10 | 1 1 1 1<br>1 0 1 0 |
| 4/5 | 8/9 | 1 1 1 1<br>1 0 0 0 |

CHANNEL CODING BASED ON HIDDEN PUNCTURING FOR PARTIAL-BAND INTERFERENCE CHANNELS

FIELD OF THE INVENTION

The present invention relates generally to digital audio broadcasting (DAB) and other techniques for transmitting information in a communication system.

BACKGROUND OF THE INVENTION

Proposed systems for digital audio broadcasting (DAB) in the AM and FM radio bands are expected to provide improved-quality audio, data services, and more robust coverage than existing analog transmissions. These all-digital systems are often referred to as in-band on-channel (IBOC) DAB systems. However, until such time as a transition to all-digital DAB can be achieved, broadcasters require an intermediate solution in which the analog and digital signals can be transmitted simultaneously within the same licensed band. Such systems are typically referred to as hybrid in-band on-channel (HIBOC) DAB systems, and are currently being developed for both the AM and FM radio bands.

The above-noted DAB systems may be designed such that partial-band interference exists in certain areas of the system or under certain operating conditions. For example, it may be desirable in these systems to allow digital sidebands of adjacent carriers to overlap to a limited extent in specified areas or operating conditions, such that higher bit rates can be supported.

Techniques for alleviating the effects of partial-band interference and otherwise improving the performance of IBOC and HIBOC DAB systems are described in U.S. patent application Ser. No. 09/290,819 filed Apr. 13, 1999 in the name of inventors D. Mansour, D. Sinha and C.-E. W. Sundberg and entitled "Multistream In-band On-channel Systems," U.S. patent application Ser. No. 09/322,848 filed May 28, 1999 in the name of inventors J. N. Laneman and C.- E. W. Sundberg and entitled "Soft Selection Combining Based on Successive Erasures of Frequency Band Components in a Communication System," U.S. patent application Ser. No. 09/464,042 filed Dec. 15, 1999 in the name of inventors J. N. Laneman, D. Sinha, C.-E. W. Sundberg and J. W. Tracey and entitled "Error Screening Based on Code and Control Information Consistency in a Communication System," and U.S. patent application Ser. No. 09/464,043 filed Dec. 15, 1999 in the name of inventors J.N. Laneman, D. Sinha and C.-E. W. Sundberg and entitled "Channel Code Configurations for Digital Audio Broadcasting Systems and Other Types of Communication Systems," all of which are assigned to the assignee of the present invention and incorporated by reference herein.

A DAB system may use as a channel code a complementary punctured pair convolutional (CPPC) code with optimum bit placement (OBP) in the digital sidebands. A number of CPPC codes and OBP techniques suitable for use in IBOC and HIBOC systems are described in, e.g., U.S. patent application Ser. No. 09/217,655, filed Dec. 21, 1998 in the name of inventors B. Chen and C.-E. W. Sundberg and entitled "Optimal Complementary Punctured Convolutional Codes," which is assigned to the assignee of the present invention and incorporated by reference herein. The bit placement may be optimized, e.g., for a case in which the outermost frequency components are expected to be the sideband components most susceptible to first adjacent interference.

Despite the considerable advances provided by the techniques described in the above-cited U.S. Patent Applications, a need nonetheless remains for further performance improvements in DAB systems and other systems subject to partial-band interference.

SUMMARY OF THE INVENTION

The present invention provides methods and apparatus for channel coding in digital audio broadcasting (DAB) systems or other types of digital communication systems, so as to provide enhanced performance relative to conventional systems in the presence of partial-band interference. In accordance with one aspect of the invention, digital information is processed for transmission in a communication system using a hidden puncturing technique. The digital information is encoded using a channel code having at least one puncturing pattern associated therewith. The puncturing pattern is preferably a rate compatible puncturing pattern. There is no puncturing of the channel code applied at a transmitter side of the system. Instead, the resulting channel coded bits are assigned to different sections of a digital sideband or other portion of a frequency spectrum of the system, based at least in part on the puncturing pattern. The coded channel bits are then transmitted through the system in the assigned sections, and can be decoded at different code rates in a receiver of the system depending on which of the sections are used in the decoding process. By allowing different sections to be erased and the decoding to proceed at a corresponding higher code rate, the invention alleviates the effects of partial-band interference in the system.

In an illustrative embodiment of the invention, the digital information is transmitted using both an inner channel code and an outer channel code. The above-described assignment of channel coded bits to the different sections of the portion of the frequency spectrum is then applied to the inner channel coded bits. An error indicator generated using the outer code may then be utilized in the receiver to determine which of the sections of the portion of the frequency spectrum should be decoded as part of the decoding process.

In accordance with another aspect of the invention, the above-noted decoding process may be implemented by first decoding the channel code using all of the sections. Then, if a cyclic redundancy check (CRC) or other specified error criteria is not satisfied, one or more of the sections are erased and the decoding is repeated using the remaining subset of the sections at a corresponding higher code rate. This process may be repeated until the specified error criteria is satisfied or all of the possible code rates have been decoded. If the specified error criteria remains unsatisfied after all of the possible code rates have been decoded, an error mitigation algorithm in a source decoder may be triggered.

An advantage of the hidden puncturing technique of the present invention is that it does not require estimates of partial-band interference levels. Instead, the above-noted CRC or another type of error indicator may be used as an indicator of the presence of such interference.

The invention is particularly well-suited for use with convolutional codes or Turbo codes, but could also be used with other types of channel codes.

The invention can be applied to any type of digital information, including, for example, audio, data, video and image information, as well as various combinations thereof. In addition, the invention may be implemented in numerous applications other than FM and AM HIBOC DAB systems, such as Internet and satellite broadcasting systems, systems for simultaneous delivery of audio and data, etc.

BRIEF DESCRIPTION OF THE DRAWINGS

FIGS. 4, 5 and 6 show tables of rate compatible puncturing patterns for example channel codes that may be utilized in conjunction with the invention.

FIG. 7 illustrates partial-band interference that can arise in a HIBOC DAB system having a frequency spectrum such as that shown in FIG. 1.

DETAILED DESCRIPTION OF THE INVENTION

The invention in the illustrative embodiment to be described below provides channel coding techniques particularly well-suited for use in the transmission of source coded audio information bits, e.g., compressed audio bits generated by an audio coder such as a perceptual audio coder (PAC). It should be understood, however, that the channel coding techniques of the invention may be applied to many other types of information, e.g., video or image information, and other types of source coded bit streams. In addition, the invention may be utilized in a wide variety of different types of communication system applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems.

Figure 1:
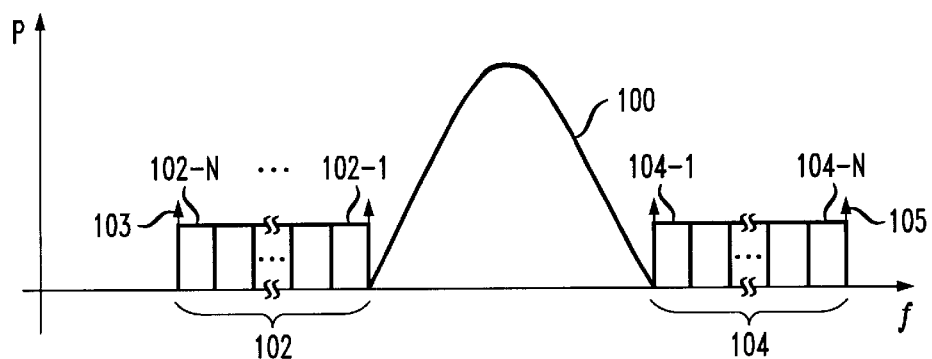
FIG. 1 shows a portion of a frequency spectrum of a hybrid, in-band on-channel (HIBOC) digital audio broadcasting (DAB) system.

FIG. 1 illustrates a portion of a frequency spectrum in an exemplary FM hybrid, in-band on-channel (HIBOC) digital audio broadcasting (DAB) system in which an illustrative embodiment of the invention may be implemented. The spectrum is plotted as power P as a function of frequency $f$. The portion of the spectrum shown includes an analog host FM signal 100 with associated lower digital sideband 102 and upper digital sideband 104. The sidebands represent portions of the frequency spectrum used to transmit digital audio information in the HIBOC DAB system.

The system in the illustrative embodiment to be described herein may use a cyclic redundancy check (CRC) code as an outer forward error correcting (FEC) or error detecting channel code, and differential quadrature phase shift keyed (DQPSK)/orthogonal frequency division multiplexed (OFDM) modulation. The DQPSK modulation of transmitted symbols provides robustness to frequency-selective fading and oscillator phase drift. The differential encoding is performed in frequency between OFDM tones. The digital signal to be transmitted and the outer CRC block code are repeated in each of the sidebands 102, 104. It should be understood, however, that the present invention can be used with a wide variety of other types of modulation. For example, coherent QPSK modulation may be used in place of DQPSK.

As shown in FIG. 1, each of the sidebands 102, 104 include N components, 102-1, 102-2, ... 102-N, and 104-1, 104-2, ... 104-N, respectively. The components may represent, e.g., sets of OFDM carriers. Pilot tones 103 are present at either end of the sideband 102, and pilot tones 105 are present at either end of the sideband 104. Additional pilot tones, which are not shown, may be present elsewhere in the portion of the frequency spectrum shown. The pilot tones 103, 105 correspond to selected OFDM reference tones, and may be used, e.g., to determine the presence of interference. It should be emphasized that the use of pilot tones to determine interference is not a requirement of the invention. In fact, a particular advantage of the channel coding techniques of the invention is that they do not require an estimation or other determination of interference, as will be described in greater detail below.

It should also be noted that the pilot tones 103, 105 need not be present at all times, and may be eliminated altogether in other embodiments of the invention. For example, the pilot tones may be used only at certain times, e.g., to measure interference, and at other times the corresponding frequency slots could be used for data transmission or other purposes. It is generally desirable to minimize the number of pilot tones so as to have the maximum amount of spectrum available for data transmission.

The present invention provides improved channel coding techniques that may be implemented in the HIBOC DAB system of FIG. 1 as well as in other types of communication systems. An example HIBOC system having a spectrum of the type illustrated in FIG. 1 will now be described in greater detail with reference to FIGS. 2 and 3.

Figure 2:
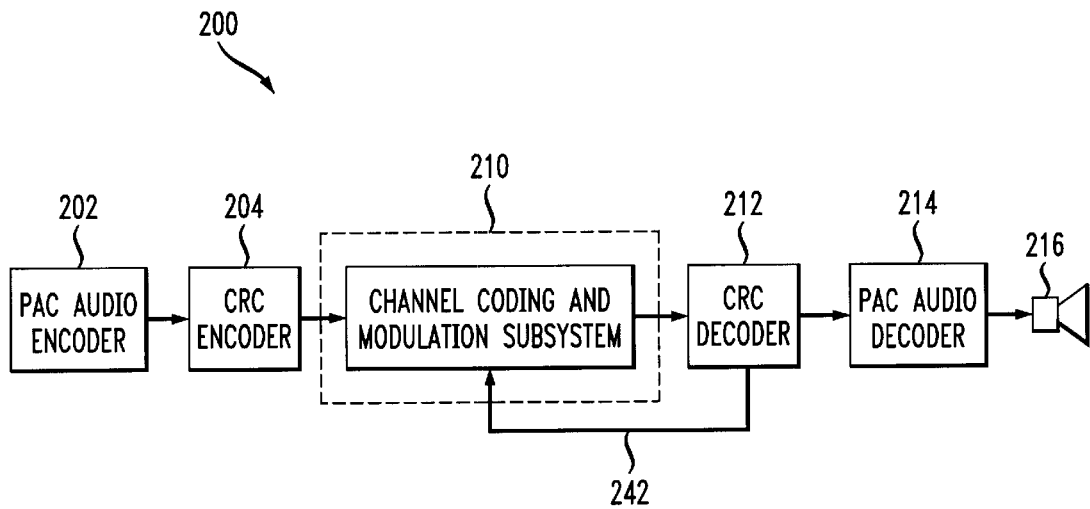
FIG. 2 is a block diagram of a HIBOC DAB system in which the invention may be implemented.

FIG. 2 shows an exemplary FM HIBOC DAB system 200 in which the invention may be implemented. The system 200 includes portions of a transmitter and a receiver. It should be noted that FIG. 2 shows primarily the digital portions of the system, i.e., the portions associated with generation and processing of the digital signals. Additional conventional processing elements may be used to process the analog signals.

In the system 200, a PAC audio coder 202 generates an encoded audio signal at a bit rate of, e.g., 96 kbps using the audio compression techniques described in, e.g., D. Sinha, J. D. Johnston, S. Dorward and S.R. Quackenbush, "The Perceptual Audio Coder," in Digital Audio, Section 42, pp. 42-1 to 42-18, CRC Press, 1998. The encoded audio bit stream is applied to a CRC encoder 204, which generates CRC bits in a conventional manner using a CRC error detecting block code, and then to a channel coding and modulation subsystem 210 in which the present invention is implemented.

It should be noted that the channel coding and modulation subsystem in this example is assumed to include an FM broadcast channel, as will be described in greater detail below in conjunction with FIG. 3.

As previously noted, the CRC is an example of one type of outer code that may be used in the system 200. Other possible outer codes suitable for use with the present invention include, e.g., Reed-Solomon (RS) codes, Bose-Chadhuri-Hocquenghem (BCH) codes, as well as other types of block codes. Other cyclic codes, as well as non-cyclic shortened codes, can also be used as outer codes in accordance with the invention. The invention can also be implemented in systems which do not utilize an outer channel code, e.g., in systems in which channel coding is provided using only an "inner" convolutional code.

Figure 3:
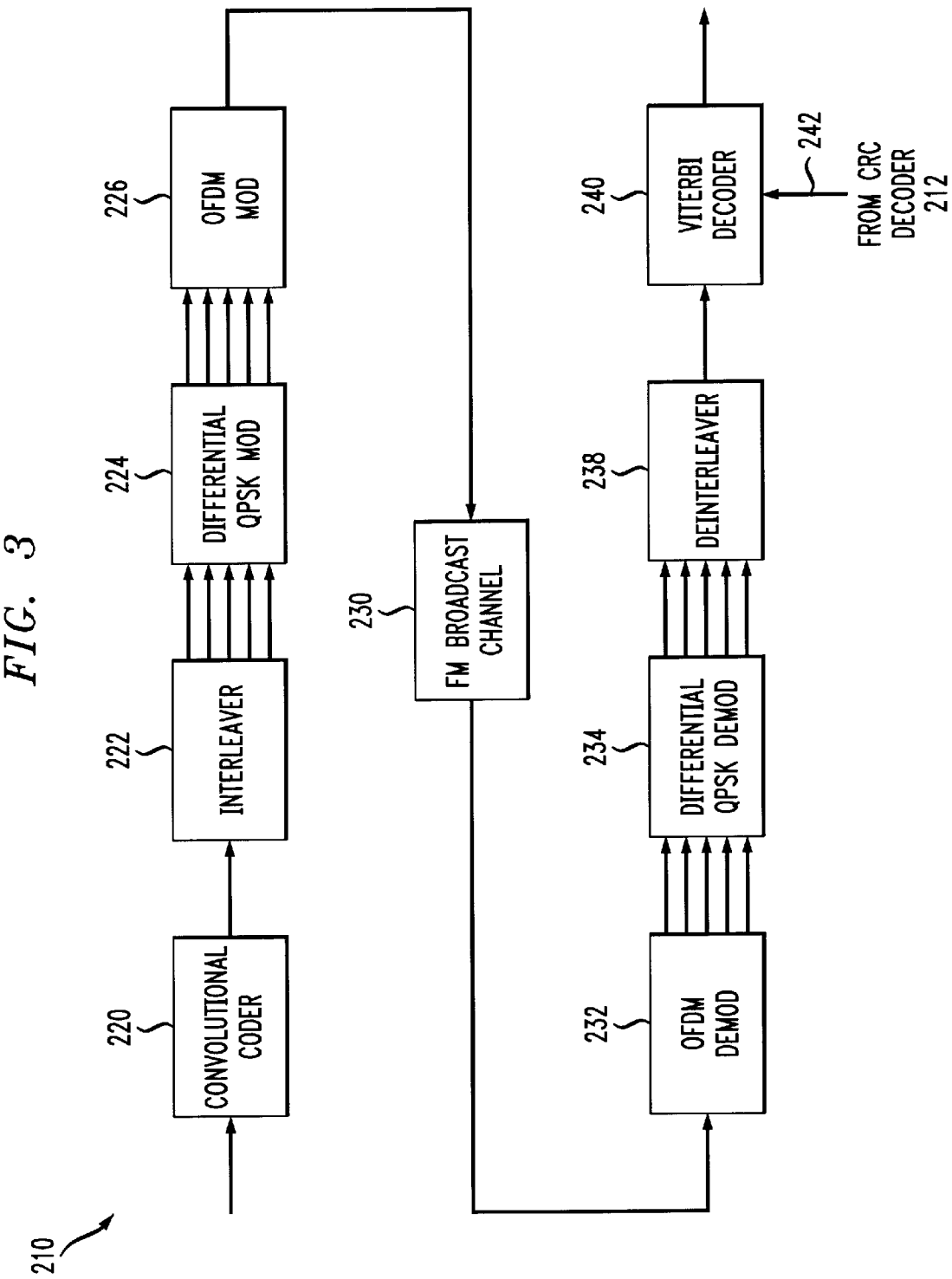
FIG. 3 is a block diagram showing a more detailed view of a channel coding and modulation subsystem of the FIG. 2 HIBOC DAB system.

As shown in FIG. 3, the subsystem 210 performs channel coding, modulation, transmission, reception, demodulation and channel decoding operations. It is assumed for purposes of illustration that the subsystem 210 includes an FM broadcast channel 230 over which the HIBOC DAB signals are transmitted. The subsystem 210 of FIG. 3 comprises a transmitter portion including a convolutional coder 220 for implementing an inner channel code, an interleaver 222, a DQPSK modulator 224, and an OFDM modulator 226.

The convolutional coding performed in coder 220 is an example of a type of inner channel code that may be used in the system 200. As will be described in greater detail below, other types of inner channel codes may also be used, including so-called Turbo codes, block codes and coding associated with trellis coded modulation. Convolutional codes and Turbo codes are the preferred codes for use in the illustrative embodiment of the invention. The former codes can be decoded in an efficient manner using conventional Viterbi decoding, while the latter codes exhibit a longer delay and higher complexity but generally provide better performance.

It should also be noted that the invention may be implemented using complementary punctured pair convolutional (CPPC) codes, as described in the above-cited U.S. patent application Ser. No. 09/217,655, although it does not require the use of such codes.

The modulated output of the OFDM modulator 226, which corresponds to the digital sidebands 102 and 104, is transmitted through the FM broadcast channel 230 to a receiver portion including an OFDM demodulator 232, a DQPSK demodulator 234, a deinterleaver 238, and a Viterbi decoder 240.

Referring again to FIG. 2, the demodulated and decoded received signal from the receiver, portion of the subsystem 210 is applied to a CRC decoder 212, and then to a PAC audio decoder 214. The CRC decoder 212 generates an error flag which is supplied via output 242 to the Viterbi decoder 240 of FIG. 3. The error flag may also be used to trigger conventional error mitigation processes in the PAC audio decoder 214. The reconstructed audio signal from decoder 214 is applied to an output device 216, e.g., a speaker or set of speakers, for conversion to an audibly-perceptible form.

The Viterbi decoder 240 of FIG. 3 may utilize List Viterbi algorithm (LVA) techniques in which a CRC error flag or other type of outer code error flag is used to trigger selection of one or more alternative decoding paths generated by the decoder. For example, a CRC error flag supplied via output 242 may trigger selection of a next-most-likely path if the error flag indicates an error in the most-likely path, and so on.

Another example of an LVA technique suitable for use with the present invention is a so-called "short list" type of List Viterbi decoding. The list size in the illustrative embodiment is preferably on the order of, e.g., two, three or four entries. The short list is acceptable because partial-band interference signals in typical FM HIBOC DAB systems generally lead to slowly changing interference levels, e.g., as a receiver in an automobile moves within an area with a first adjacent interference signal. Furthermore, it will generally be desirable for a given erased component to remain erased over a number of CRC frames. The exact list sizes and number of component erasures may be established using simulations, as will be apparent to those skilled in the art.

It should also be noted that for each level of erasure in the hidden puncturing of the present invention, a separate LVA decoding or other type of decoding will be performed.

Additional details regarding LVA techniques suitable for use in conjunction with the present invention are described in U.S. Pat. No. 6,108,386, issued Aug. 22, 2000 in the name of inventors B. Chen and C.-E. W. Sundberg and entitled "List Viterbi Algorithms for Continuous Data Transmission," which is incorporated by reference herein.

The communication system 200 as described in conjunction with FIGS. 2 and 3 may include additional processing elements, such as modulators, multiplexers, upconverters and the like, which are not shown for simplicity of illustration. In addition, these embodiments may be implemented using other arrangements of elements, including elements other than those shown. Moreover, certain signal processing elements, such as the coders and decoders, may be implemented at least in part using one or more application-specific integrated circuits (ASICs), microprocessors or other types of digital data processors, as well as portions or combinations of these and other known devices. Various elements of the illustrative embodiment may also be implemented in whole or in part in the form of one or more software programs executed by a central processing unit (CPU) or the like in a digital data processor.

It should again be emphasized that the above-described configuration of the FM HIBOC system in the illustrative embodiment of the invention is by way of example only. Those skilled in the art will appreciate that the improved channel coding techniques of the present invention may be implemented in numerous other types of systems.

As previously noted, the present invention provides improved channel coding techniques for use in a communication system such as the FM HIBOC system described in conjunction with FIGS. 1, 2 and 3. These channel coding techniques, which are particularly well-suited for alleviating the effects of partial-band interference, are generally referred to herein as "hidden puncturing." The hidden puncturing will be described in detail below using example channel codes, i.e., a rate-½ memory-6 convolutional code, a rate-⅓ parallel-concatenated Turbo code and a rate-½ memory-2 Turbo code. The puncturing for these codes is illustrated in conjunction with FIGS. 4, 5 and 6. It should be emphasized that these codes are examples only, and that the invention can be implemented using different types of codes, as well as different code rates, memories, puncturing patterns or other parameters.

FIG. 4 is a table showing puncturing patterns for the example rate-½ memory-6 convolutional code. The unpunctured code has a rate R of ½. The table shows the puncturing patterns used to puncture the rate-½ code to generate rate-4/7,pe1 53 rate-⅔ and rate-⅘ codes, with a puncturing period of 4. These codes are an example of the class of rate compatible punctured convolutional (RCPC) codes, as described in, e.g., J. Hagenauer, "Rate-Compatible Punctured Convolutional Codes (RCPC Codes) and Their Applications," IEEE Transactions on Communications, 36(4):389–400, April 1988, which is incorporated by reference herein. The unpunctured rate-½ code is referred to a "mother code" and is represented by the following generator matrix:

$$G_6\binom{133_8}{171_8} = \binom{1\ 0\ 1\ 1\ 0\ 1\ 1}{1\ 1\ 1\ 1\ 0\ 0\ 1}.$$

The above-noted example rate-⅓ Turbo code is generated as a parallel concatenation of two rate-⅔ component codes which are represented by generator matrices:

$$G_2\binom{7_8}{5_8} = \binom{1\ 1\ 1}{1\ 0\ 1},$$

as described in J. Hagenauer et al., "Iterative Decoding of Binary Block and Convolutional Codes," IEEE Transactions on Information Theory, 42(2):429–444, March 1996, which is incorporated by reference herein.

FIG. 5 shows rate compatible puncturing patterns for the rate-⅓ Turbo code, with a puncturing period of 8. The puncturing is applied to the component codes, and the resulting total rate R as a function of the component rates $R_c$ is given by:

$$R = \frac{1}{\frac{2}{R_c} - 1}.$$

Figures 6, 7:
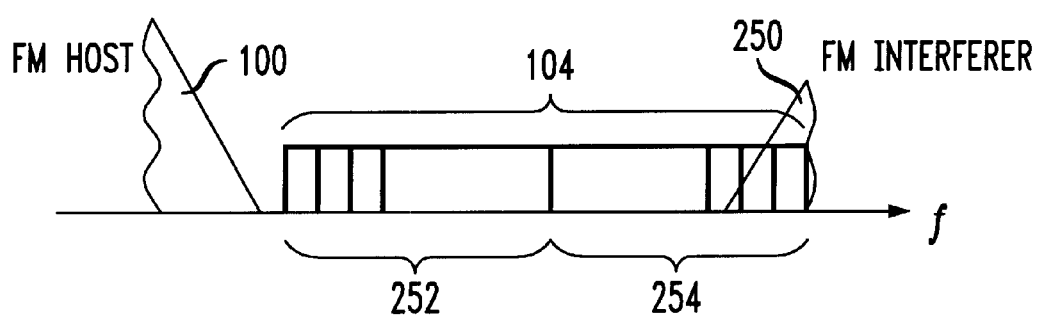

FIG. 6 shows rate compatible puncturing patterns for the example rate-½ memory-2 Turbo code. It should be noted that the puncturing applied to the component rate-⅔ codes for obtaining a total rate of ½ in the FIG. 5 table is exactly the same puncturing that may be used to construct the example rate-½ Turbo code. The bits used for this rate-½ Turbo code are shown in bold type in FIG. 5. The rate-½ Turbo code may thus be viewed as a new "mother code" which can itself be punctured to generate higher rate codes, using the puncturing patterns of FIG. 6.

The hidden puncturing techniques of the present invention will now be described in greater detail with reference to FIGS. 7, 8 and 9 and the example channel codes given above. In conventional usage of the example channel codes, these codes are explicitly punctured in the transmitter of the system to adjust the transmission rate. The present invention, in contrast to this conventional usage, does not puncture the codes at the transmitter side, but instead uses the puncturing patterns to determine an appropriate placement of the coded bits into different sections in the OFDM spectrum. The term "hidden puncturing" is used for this technique in that there is no explicit puncturing at the transmitter side for rate adjustment. As will be apparent to those skilled in the art, hidden puncturing is suitable for use in any communication system exhibiting partial-band interference and in which rate compatible codes or other codes having puncturing patterns can be used. Advantageously, the hidden puncturing approach of the present invention provides a flexible and efficient approach to handling time-varying and space-varying interference.

FIG. 7 illustrates an example of a type of partial-band interference that is alleviated by the hidden puncturing of the present invention. In this example, an outermost portion of the digital sideband 104 associated with FM host 100 is subject to partial-band interference from a first adjacent FM interferer 250. It can be seen that the portions of the digital sideband 104 that are most impacted by the interferer 250 are the outermost portions of the sideband. The digital sideband 104 in this example is a multistream system sideband which includes a first portion 252 corresponding to a first digital bitstream and a second portion 254 corresponding to a second digital bitstream.

In accordance with the invention, each of the portions 252 and 254 of the multistream digital sideband 104 is partitioned into different sections, and the channel coded bits are placed into the different sections based on the rate compatible puncturing patterns. The sizes of the different sections are determined based on the particular patterns being used. In this example, the outermost sections of the first portion 252 are provided with a greater level of protection, i.e., a lower code rate, than the innermost sections of the first portion 252. Similarly, the innermost sections of the second portion 254 are provided with a greater level of protection than the outermost sections of the second portion 254. Of course, many different sectioning arrangements are possible, depending on the particular channel characteristics in a given application. The sectioning therefore need not be as shown in the figure. In addition, different channel codes could be used for different sections or groups of sections.

It should be appreciated that the arrangement of FIG. 7 also provides protection of the portion 252 against self-interference from the FM host 100.

The invention does not require explicit application of unequal error protection (UEP) techniques, but can instead rely on frequency band placement to provide different levels of error protection. It should also be noted that the invention does not require a multistream system. An example of sideband sectioning for a single-stream system will be described below in conjunction with FIG. 9. Moreover, the hidden puncturing can be applied to digital frequency spectra without AM or FM carriers, e.g., in the case of an all-digital IBOC system. In the latter case, the steep slope associated with the spectrum is well-suited to use with hidden puncturing.

Figure 8:
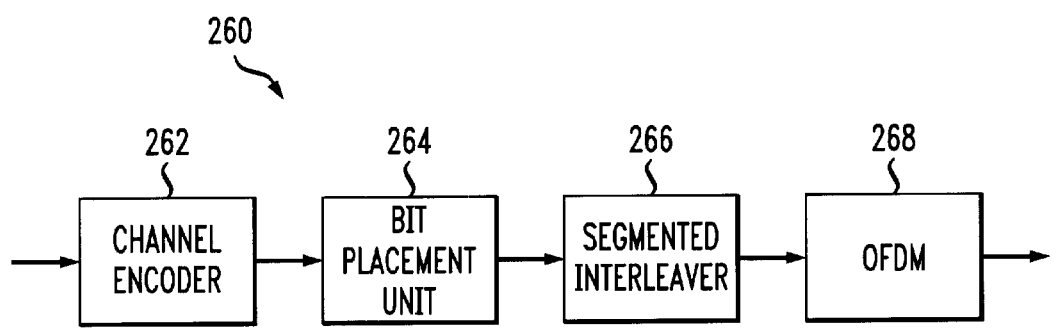
FIG. 8 is a simplified block diagram of a transmitter portion of a HIBOC DAB system in accordance with an illustrative embodiment of the invention.

FIG. 8 shows a block diagram of a portion of a communication system transmitter 260 suitable for implementing the hidden puncturing of the present invention. The portion of the transmitter 260 shown in the figure includes a channel encoder 262, a bit placement unit 264, a segmented interleaver 266 and an OFDM unit 268. Elements 262, 266 and 268 correspond generally to elements 220, 222 and 224–226 of the previously-described channel coding and modulation subsystem 210 of FIG. 3. The bit placement unit 264 organizes coded bits from the channel encoder 262 in accordance with the rate compatible puncturing patterns such that the bits will be present in the appropriate sections of the digital sideband generated by the OFDM unit 268. The interleaver 266 is a segmented interleaver configured to interleave in time and frequency only within each of the specified sections of the digital sideband, so as to preserve the assignment of channel coded bits to sideband sections as implemented by the bit placement unit 264.

The corresponding receiver side of a system having the transmitter 260 of FIG. 8 can determine which of the different sections of the sideband and therefore which code rate should be detected. More particularly, the receiver can exclude from the channel decoding process the sections that are subject to high interference levels. By excluding such sections, and thus using a weaker, higher-rate channel code, significant performance gains may be possible relative to attempting to decode all sections using the lowest rate. It should be noted that the effectiveness of this hidden puncturing technique is highly dependent on the characteristics of the spectrum of the interferer, such as the slope of the host signal spectrum. The technique may not be effective in certain systems, such as a multistream system with interferers lacking a steep spectrum slope.

The operation of the bit placement unit 264 will now be described in greater detail with reference to the example bit placement shown in FIG. 9. As previously noted, this example is for a single-stream system, and is used for clarity and simplicity of illustration. Those skilled in the art will recognize that the described placement techniques can be extended in a straightforward manner to multistream systems.

Figure 9:
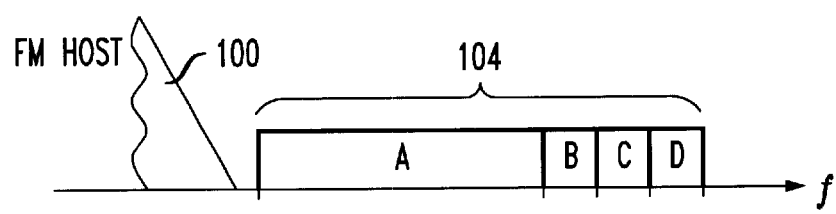
FIG. 9 illustrates the operation of the bit placement unit in the transmitter portion of the HIBOC DAB system of FIG. 8.

In the FIG. 9 example, the single-stream digital sideband 104 is partitioned into four different sections, denoted A, B, C and D. As previously noted, the size of the sections is determined based on the particular rate compatible puncturing patterns used. The channel coded bits can then be placed into the sections in accordance with the puncturing patterns. More particularly, for the period-4 puncturing patterns of FIGS. 4 and 6, the channel coded bits are placed into the sections A, B, C and D as follows:

$$P_4 = \begin{pmatrix} A & A & A & A \\ A & C & B & D \end{pmatrix},$$

where $P_4$ identifies for a given puncturing pattern matrix which of the sections is to receive each channel coded bit.

At the receiver side, each of the code rates represented by the different puncturing patterns can now be decoded by decoding only the corresponding sections. The correspondence between the different code rates and the sections is shown in TABLE 1 below, for the example rate-½ convolutional and Turbo codes described previously.

TABLE 1

Sections to be decoded for the different code rates.

| Rate | Sections |
| --- | --- |
| 1/2 | A,B,C,D |
| 4/7 | A,B,C |
| 2/3 | A,B |
| 4/5 | A |

The same decoder may be used for all of the code rates. A given section that is not to be decoded for a certain code rate may have its channel coded bits set to zeros at the decoder input, such that it does not have any influence on the decoding process. The given section is thereby considered "erased." It should be noted that other techniques may be used to provide such erasure, e.g., the bits corresponding to the given section may simply be discarded.

An example decoding process for a rate-½ convolutional or Turbo code in the FM HIBOC DAB system of FIGS. 1 through 3 will now be described. As previously described, the rate-½ convolutional or Turbo code is an inner channel code in such a system, and a CRC code is used as an outer channel code. The decoding process is as follows:

1. Decode the rate-½ outer channel code using sections A, B, C and D.
2. If the CRC is not satisfied, erase section D and decode the rate-4/7 code.
3. If the CRC is still not satisfied, erase sections C and D and decode the rate-⅔ code.
4. If the CRC is still not satisfied, erase sections B, C and D and decode the rate-⅘ code.
5. If the CRC is still not satisfied, erase the entire sideband and rely only on the other sideband, e.g., sideband 102 of FIG. 1.

If step 5 of the decoding process is reached, an error mitigation algorithm in the PAC decoder 214 may be triggered.

An advantage of the above-described hidden puncturing technique of the present invention is that it does not require estimates of the interference levels. Instead, the CRC is used as an indicator of the presence of interference. Other embodiments, however, may utilize estimates of interference levels in place of or in conjunction with the CRC. In embodiments in which interference can be estimated, the soft combining approach described in the above-cited U.S. patent application Ser. No. 09/322,848 may be applied.

As noted previously, the CRC is only an example of one type of outer channel code that may be used in conjunction with the hidden puncturing techniques of the invention. Alternative embodiments of the invention can utilize other types of outer codes, e.g., RS, BCH or other block codes.

The invention can also be implemented using only a single channel code, e.g., only an inner convolutional or Turbo code with hidden puncturing in accordance with the invention. In such an arrangement, which does not utilize an outer code, the inner code may be simply referred to as a channel code. In these types of embodiments, other means may be used to indicate the presence of errors so as to trigger erasures of particular frequency sections, including, e.g., Viterbi decoder metrics, interference measures, Huffman screening, etc. An example of an error screening technique of this type is described in the above-cited U.S. patent application Ser. No. 09/464,042.

Although illustrated in the context of frequency division multiplexing (FDM), the invention can also be applied to a wide variety of frame formats, including time division multiplexed (TDM) and code division multiplexed (CDM) formats, as well as combinations of TDM, FDM, CDM and other types of frame formats. Furthermore, other types of modulation formats may be used.

It should also be noted that the invention can be used with a wide variety of other types and arrangements of frequency spectra, e.g., spectra with a single frequency band and no host carrier signal, spectra with more than two sidebands, etc.

The invention can be applied to the transmission of digital information other than audio, such as data, video, images and other types of information. Although the illustrative embodiment uses audio packets, such as those generated by a PAC encoder, the invention is more generally applicable to digital information in any form or generated by any type of compression technique. The invention may be implemented in a wide variety of applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing digital information for transmission in a communication system, wherein the digital information is transmitted using at least one channel code, the method comprising the steps of:

encoding the digital information using the at least one channel code; and assigning coded channel bits to different sections of a portion of a frequency spectrum of the system based at least in part on a puncturing pattern associated with the channel code;

wherein the coded channel bits are transmitted through the system in the assigned sections, and further wherein the coded channel bits can be decoded at different code rates in a receiver of the system depending on which of the sections are used in the decoding process.

2. The method of claim 1 wherein the digital information is transmitted using an inner channel code and an outer channel code, and the encoding and assigning steps are applied to coded bits generated using the inner channel code.

3. The method of claim 2 wherein the outer code comprises at least one of a CRC code, an RS code and a BCH code.

4. The method of claim 2 wherein an error indicator generated using the outer code is utilized in the receiver to determine which of the sections of the portion of the frequency spectrum should be decoded as part of the decoding process.

5. The method of claim 1 wherein the puncturing pattern comprises a rate compatible puncturing pattern.

6. The method of claim 1 wherein the channel code comprises a convolutional code.

7. The method of claim 1 wherein the channel code comprises a Turbo code.

8. The method of claim 1 wherein the channel code comprises a rate-⅓ code.

9. The method of claim 1 wherein the channel code comprises a rate-½ code.

10. The method of claim 1 wherein the digital information comprises audio information.

11. The method of claim 1 wherein the portion of the frequency spectrum comprises a digital sideband of a host carrier signal.

12. The method of claim 1 wherein a particular subset of the plurality of sections of the portion of the frequency spectrum are selected to minimize a performance impact of partial-band interference in the system.

13. The method of claim 1 wherein the portion of the frequency spectrum is partitioned into the different sections such that the number of sections corresponds to a period of the puncturing pattern.

14. The method of claim 1 wherein the portion of the frequency spectrum comprises at least four sections A, B, C and D, and the channel coded bits are assigned to the sections based on a puncturing pattern having a period of four in accordance with the following assignment:

$$P_4 = \begin{pmatrix} A & A & A & A \\ A & C & B & D \end{pmatrix},$$

where $P_4$ identifies for a given puncturing pattern matrix which of the sections is to receive each channel coded bit.

15. The method of claim 14 wherein a different code rate is associated with each of the following groupings of the four sections: (i) A, B, C and D, (ii) A, B and C, (iii) A and B, and (iv) A.

16. The method of claim 1 wherein the decoding process is implemented using the following steps:
(a) decode the channel code using all of the sections;
(b) if a specified error criteria is not satisfied, erase a designated section and then decode a remaining subset of the sections at a corresponding higher rate; and
(c) repeat step (b) until the error criteria is satisfied or all of the possible code rates have been decoded.

17. An apparatus for processing digital information for transmission in a communication system, wherein the digital information is transmitted using at least one channel code, the apparatus comprising:

a transmitter operative to encode the digital information using the at least one channel code, and to assign coded channel bits to different sections of a portion of a frequency spectrum of the system based at least in part on a puncturing pattern associated with the channel code, wherein the coded channel bits are transmitted through the system in the assigned sections, and further wherein the coded channel bits can be decoded at different code rates in a receiver of the system depending on which of the sections are used in the decoding process.

18. A transmitter for processing digital information for transmission in a communication system, wherein the digital information is transmitted using at least one channel code, the transmitter comprising:

a channel coder for encoding the digital information using the at least one channel code; and a bit placement unit operative to assign coded channel bits to different sections of a portion of a frequency spectrum of the system based at least in part on a puncturing pattern associated with the channel code;

wherein the coded channel bits are transmitted through the system in the assigned sections, and further wherein the coded channel bits can be decoded at different code rates in a receiver of the system depending on which of the sections are used in the decoding process.

19. An article of manufacture for storing one or more software programs for use in processing digital information for transmission in a communication system, wherein the digital information is transmitted using at least one channel code, and wherein the one or more programs when executed implement the steps of:

encoding the digital information using the at least one channel code; and assigning coded channel bits to different sections of a portion of a frequency spectrum of the system based at least in part on a puncturing pattern associated with the channel code;

wherein the coded channel bits are transmitted through the system in the assigned sections, and further wherein the coded channel bits can be decoded at different code rates in a receiver of the system depending on which of the sections are used in the decoding process.

* * * * *